S. B. SCIFRES.
SHEARS OR SCISSORS.
APPLICATION FILED SEPT. 3, 1910.
1,052,976.
Patented Feb. 11, 1913.
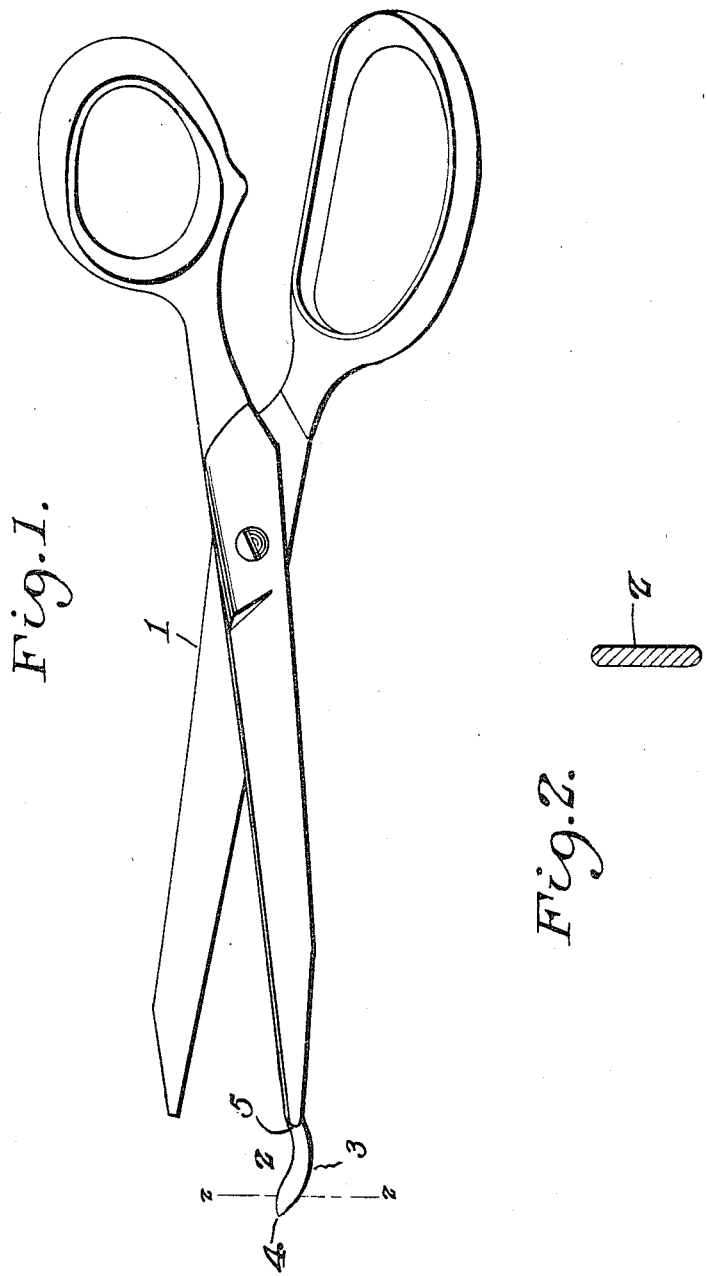
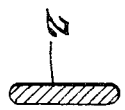
WITNESSES:
Joe. P. Wahler
A. E. McCarthy
INVENTOR:-
Simon B. Scifres
BY
J. P. McMaster
Attorney

UNITED STATES PATENT OFFICE.

SIMON B. SCIFRES, OF HAWESVILLE, KENTUCKY.

SHEARS OR SCISSORS.

1,052,976.  Specification of Letters Patent.  Patented Feb. 11, 1913.

Application filed September 3, 1910. Serial No. 580,314.

*To all whom it may concern:*

Be it known that I, SIMON B. SCIFRES, a citizen of the United States, and a resident of Hawesville, in the county of Daviess and State of Kentucky, have invented certain new and useful Improvements in Shears or Scissors, of which the following is a specification, reference being had to the accompanying drawings.

This invention relates to improvements in shears or scissors.

It has for its object principally to guard against the points of the blades of shears or scissors catching or digging into the cloth or goods, in using the scissors or shears, as now experienced.

Also a further object is to prevent the shears or scissors cutting a hole in underlying folds of the goods or cloth, which impairs or wastes the same.

Also an additional object is to aid the suitable guiding of the shears or scissors, in performing the cutting operation, and facility of movement thereof.

The invention consists of specially equipping, particularly, the lower of the blades of the shears or scissors at its forward end or point, with an upwardly extending portion or extension adapted to guide or direct the goods or cloth between the blades at an elevation slightly above the extreme forward cutting point of the lower blade.

With these and other objects in view, the present invention consists in the combination and arrangement of parts as will be hereinafter more fully explained and particularly pointed out in the appended claim, it being understood that changes within the specific structure shown and described may be made in the scope of the claim, without departing from the spirit of the invention.

In the accompanying drawings, forming a part of this specification, and in which like numerals of reference indicate similar parts in the several views:—Figure 1, is a side view of a pair of scissors or shears having said invention applied thereto, and Fig. 2, is a vertical transverse section produced through the invention; or blade-point extension on line 2—2 of Fig. 1.

In carrying out my invention, I form or provide the lower blade of a pair of shears or scissors 1, at its otherwise forward end or point, with an extension 2, approximately of runner-like shape or outline, being rounded upon its underside, as at 3, to cause it to glide or move with facility when resting upon a supporting surface, as the shears or scissors are actuated in effecting the cutting operation. The extension 2, has its forward end curved or inclined upwardly as at 4, said extension also being bowed downwardly intermediate its forward end and the scissors or shears, thus bodily elevating the shears or scissors at that point to cause its extreme forward end or point to stand slightly above the otherwise forward end or point of the blade, to guard against the piercing or cutting the underlying fold of the goods or cloth, or casually cutting a hole therein, as heretofore experienced with the use of shears or scissors. The forward upper edge of the extension or guard 2, is just sufficiently elevated to enable the blade of the shears or scissors to engage the goods or object, as the same is being received therebetween, at 5, as in the usual manner, for the effective action of the blades; this extension or guard also serving to suitably guide the object or material between the blades of the shears or scissors, as is obvious.

Having thus described my said invention what I claim as new and desire to secure by United States Letters Patent, is:—

A pair of scissors, comprising pivotally connected blades having cutting edges of equal lengths, one of said blades being provided with a guard disposed beyond the outer end of the cutting edge of the same, said guard having its inner edge curved outwardly and inwardly whereby the intermediate portion of said edge of the guard will be disposed outwardly of the cutting edge of the blade by which said guard is carried.

In testimony whereof, I affix my signature, in presence of two witnesses.

SIMON B. SCIFRES.

Witnesses:
H. D. WINKLER,
L. D. EARLY.